US012317924B1

(12) United States Patent
Ning et al.

(10) Patent No.: US 12,317,924 B1
(45) Date of Patent: Jun. 3, 2025

(54) VAPORIZER DEVICE WITH A CIGARETTE ADAPTER AND METHOD OF USING THE VAPORIZER DEVICE

(71) Applicant: SHENZHEN YIBO TECHNOLOGY CO., LTD, Shenzhen (CN)

(72) Inventors: Zhiwen Ning, Shenzhen (CN); Huagan Pan, Shenzhen (CN); Jianyong Chu, Shenzhen (CN); Lipei Tan, Shenzhen (CN)

(73) Assignee: SHENZHEN YIBO TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/786,109

(22) Filed: Jul. 26, 2024

(30) Foreign Application Priority Data

Jun. 10, 2024 (WO) ................ PCT/CN2024/098307

(51) Int. Cl.
*A24F 40/10* (2020.01)
*A24F 40/20* (2020.01)
*A24F 40/30* (2020.01)
*A24F 40/42* (2020.01)
*H01M 50/247* (2021.01)

(52) U.S. Cl.
CPC .............. *A24F 40/30* (2020.01); *A24F 40/10* (2020.01); *A24F 40/20* (2020.01); *A24F 40/42* (2020.01); *H01M 50/247* (2021.01); *H01M 2220/30* (2013.01)

(58) Field of Classification Search
CPC .......... A24F 40/20; A24F 40/10; A24F 40/40; A24F 40/42; A24F 40/30
See application file for complete search history.

(56) References Cited

U.S. PATENT DOCUMENTS

| 11,992,042 B2* | 5/2024 | Webski ............. A61M 15/0021 |
| 11,992,605 B2* | 5/2024 | Bache ...................... A24F 40/53 |
| 2013/0220315 A1 | 8/2013 | Conley et al. |
| 2017/0238617 A1* | 8/2017 | Scatterday ............. A24F 40/50 |
| 2018/0368474 A1* | 12/2018 | Bache ................ H01R 13/2421 |
| 2020/0107578 A1 | 4/2020 | Rubin |
| 2020/0146352 A1 | 5/2020 | Alston et al. |
| 2020/0229492 A1 | 7/2020 | Wilson et al. |
| 2021/0030977 A1 | 2/2021 | Harrison et al. |
| 2021/0161206 A1 | 6/2021 | Webski |
| 2021/0337872 A1 | 11/2021 | Alston et al. |
| 2022/0046997 A1* | 2/2022 | Atkins .................... A24F 40/51 |

(Continued)

FOREIGN PATENT DOCUMENTS

| CA | 3170468 A1 | 12/2021 |
| CN | 108323808 A | 7/2018 |

(Continued)

*Primary Examiner* — Abdullah A Riyami
*Assistant Examiner* — Thang H Nguyen
(74) *Attorney, Agent, or Firm* — Quinn IP Law (57) ABSTRACT

A vaporizer device comprises a cigarette adapter configured to heat a cigarette to produce a nicotine-containing vapor and including a mouthpiece and at least one cartridge comprising a vaporizable material including a flavor. The cartridge is removably coupled to the cigarette adapter such the cigarette adapter is operable to receive a vapor from the vaporizable device and provide the vapor from the vaporizable device together with the nicotine-containing vapor to the mouthpiece. A method of using a vaporizer device is also disclosed.

20 Claims, 6 Drawing Sheets

(56) References Cited

U.S. PATENT DOCUMENTS

| | | | |
|---|---|---|---|
| 2022/0160031 A1 | 5/2022 | Griffin et al. | |
| 2023/0172264 A1* | 6/2023 | Tesfatsion | A24D 1/20 131/328 |
| 2023/0225403 A1 | 7/2023 | Chen et al. | |
| 2024/0268459 A1 | 8/2024 | Chung et al. | |

FOREIGN PATENT DOCUMENTS

| | | | | |
|---|---|---|---|---|
| CN | 109310155 A | 2/2019 | | |
| CN | 112672658 A | 4/2021 | | |
| CN | 112867405 A | 5/2021 | | |
| CN | 113645866 A | 11/2021 | | |
| CN | 114271543 A | 4/2022 | | |
| CN | 115666292 A | 1/2023 | | |
| CN | 116367743 A | 6/2023 | | |
| CN | 117999005 A | 5/2024 | | |
| DE | 202014011275 U1 | 12/2018 | | |
| JP | 2023535272 A | 8/2023 | | |
| JP | 2023547059 A | 11/2023 | | |
| WO | WO-2016079152 A1 * | 5/2016 | ........... | A24B 15/167 |
| WO | 2016090426 A1 | 6/2016 | | |
| WO | 2020247857 A1 | 12/2020 | | |
| WO | 2023104720 A1 | 6/2023 | | |

\* cited by examiner

VAPORIZER DEVICE WITH A CIGARETTE ADAPTER AND METHOD OF USING THE VAPORIZER DEVICE

TECHNICAL FIELD

The present invention generally relates to a vaporizer device, and more specifically, to a vaporizer device including a cigarette adapter.

BACKGROUND

A vaporizer device vaporizes a material to produce vapor with a desirable smell or taste. In general a vaporizer device includes a battery, a cartridge containing a vaporizable material, and a heating element powered by the battery and operable to heat and vaporize the material. Typical vaporizers include, or are configured to receive a single cartridge. If a user prefers a different smell or taste, the cartridge must be removed and replaced with a different one. Moreover, a user is not able to combine smells or tastes with the typical single-cartridge vaporizer device.

SUMMARY

In one particular example according to the present disclosure, a vaporizer device includes among other possible things a cigarette adapter configured to heat a cigarette to produce a nicotine-containing vapor and including a mouthpiece and at least one cartridge comprising a vaporizable material including a flavor. The cartridge is removably coupled to the cigarette adapter such the cigarette adapter is operable to receive a vapor from the vaporizable device and provide the vapor from the vaporizable device together with the nicotine-containing vapor to the mouthpiece.

In one particular example according to the present disclosure, a method of using a vaporizer device includes among other possible things removably coupling a cartridge to a cigarette adapter, the cartridge including a vaporizable material having a flavor; providing heat energy to the cigarette adapter to create nicotine-containing vapor, and providing heat energy to the cartridge to create flavored vapor, such that the flavored vapor and the nicotine-containing vapor are together provided to a mouthpiece.

BRIEF DESCRIPTION OF THE DRAWINGS

FIGS. 1A-B illustrate an example vaporizer device.

FIGS. 2A-E illustrate an example battery module for the vaporizer device of FIGS. 1A-B.

FIGS. 3A-F illustrate an example cartridge for the vaporizer device of FIGS. 1A-B.

FIGS. 5A-C illustrate and example cigarette adapter.

DETAILED DESCRIPTION

Figure 1A:
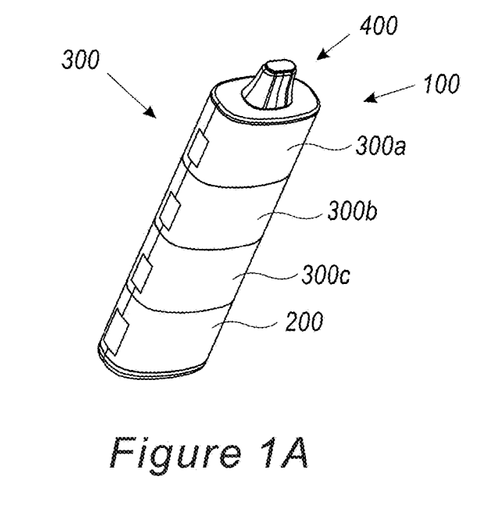
FIG. 1A is a perspective view of the device and FIG. 1B is a side view of the device.
Figure 1B:
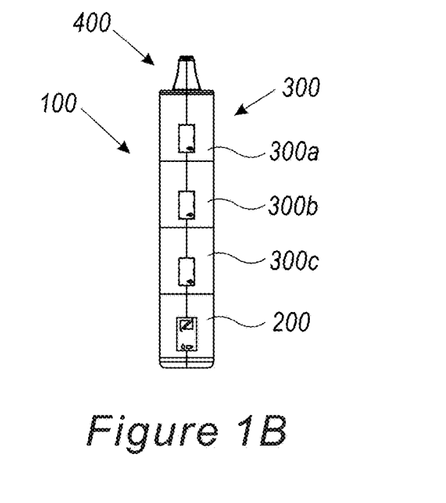

FIGS. 1A-B illustrate an example vaporizer device 100. The vaporizer device includes a battery module 200 and one or more cartridges 300. In some examples, the battery module and/or cartridges 300 may be received in a common housing. In the example of FIGS. 1A-B, there are three cartridges 300a/300b/300c, however more or less cartridges could be used. The vaporizer device 100 can be used to vaporize material to produce a scent or flavor. In the latter case, the vaporizer device 100 may further include an optional mouthpiece 400. In the former case, the vaporizer device may include means for releasing/dispersing vaporized scented material such as a fan and nozzle (not shown). Vaporizable materials are known in the art and include, by way of example only, oil-based compositions and organic solids and liquids.

The cartridge(s) 300 can have vaporizable material with different flavors/scents/active ingredients. This allows the user to customize the flavor/scent/effect of the vapor produced by the vaporizer device. For instance, the user may select a first cartridge 300a with a strawberry flavor, a second cartridge 300b with a kiwi flavor, and a third cartridge 300c with a pineapple flavor, which when used together provides a strawberry/kiwi/pineapple flavored vapor. As another example the user may select a first cartridge 300a with a rose scent and a second cartridge 300b with a lavender scent, to provide a rose/lavender scented vapor. The user may also interchange one of the first and second cartridges 300a/300b with a third cartridge 300c that has a lemon scent to provide a rose/lemon or lavender/lemon scented vapor. The user can also elect to use a single cartridge 300a or multiple cartridges 300a/300b/300c of the scent/flavor/active ingredient.

Figure 2A:
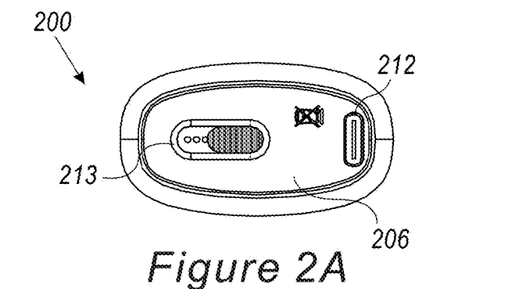
FIG. 2A illustrates a bottom view of the battery module.
Figure 2B:
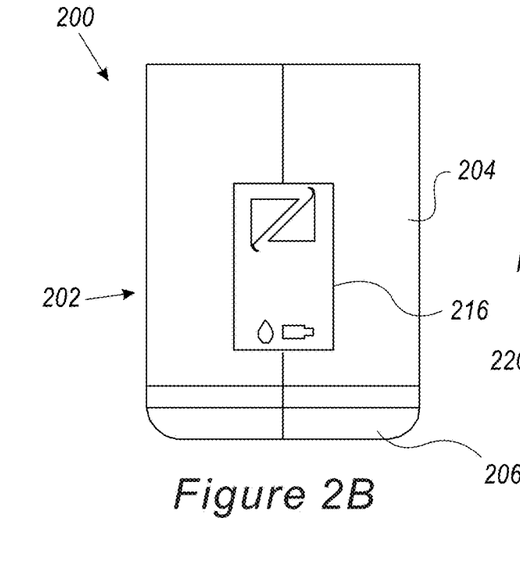
FIG. 2B illustrates a top side view of the battery module.
Figure 2C:
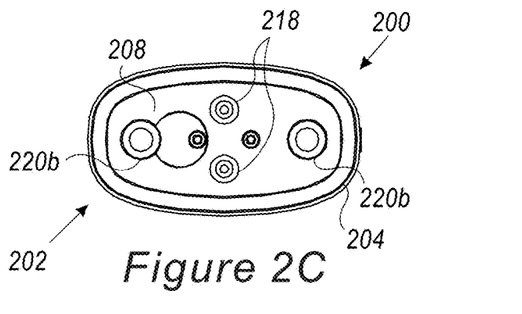
FIG. 2C illustrates a top view of the battery module.
Figure 2D:
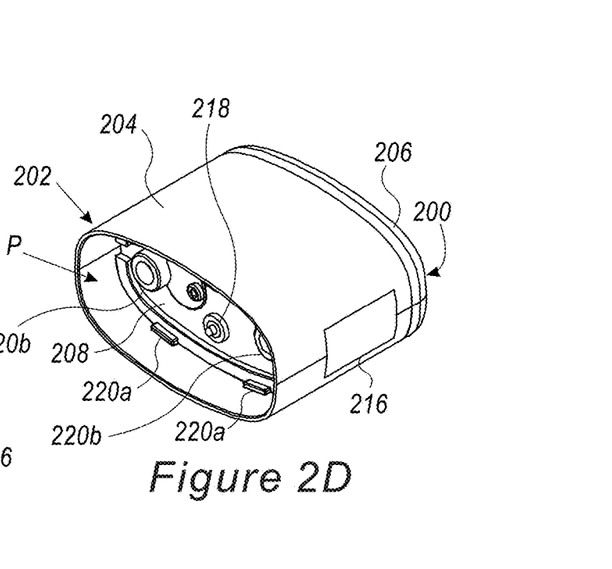
FIG. 2D illustrates a perspective view of the battery module.
Figure 2E:
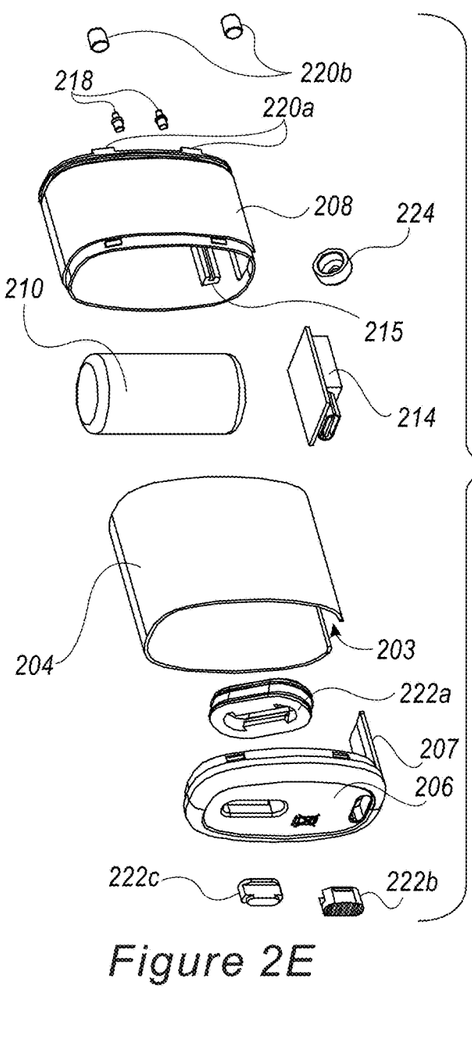
FIG. 2E illustrates an exploded view of the battery module.

FIGS. 2A-E illustrate an example battery module 200. FIG. 2A illustrates a bottom view of the battery module 200. FIG. 2B illustrates a side view of the battery module 200. FIG. 2C illustrates a top view of the battery module 200. FIG. 2D illustrates a perspective view of the battery module 200. FIG. 2E illustrates an exploded view of the battery module 200. The battery module 200 includes a housing 202, and the housing 202 in turn includes a side wall 204 and a bottom wall 206. In one example the side wall 204 includes an opening 203 and the bottom wall 206 includes a tab 207 configured to be received in the opening 203 as best seen in FIG. 2E to connect the side wall 204 and bottom wall 206. In a particular example the side wall 204 is aluminum and the bottom wall 206 is plastic.

A support structure 208 is situated in the side wall 204 and engages with the bottom wall 206. The support structure 208 may be plastic in one example. The support structure 208 helps protect the other aspects of the battery module 200 where the side wall 202 comprises a relatively soft material. In one example, best seen in FIG. 2D, the side wall 204 overhangs the support structure 208 to form a pocket P configured to receive a stepped portion S of the cartridge 300, which is discussed in more detail below.

A battery cell 210 is situated in the support structure 208. Any known battery cell 210 could be used. In a particular example, the battery cell 210 is an 1100 mAh battery. In one example, the battery cell 210 is a rechargeable battery such as a polymer lithium battery and the bottom wall 206 includes a charging port 212 operable to receive a charger (not shown) and charge the battery cell 210 as is well known. Any known charging port 212 could be used, such as a USC Type C port. The bottom wall 206 may also include an on/off switch 213 operable to engage with the battery cell 210 and/or the PCB 214 (discussed below) to turn on/off the vaporizer device 100.

In some examples the battery module 200 includes a printed circuit board (PCB) 214 with a display 216 (best seen in FIG. 2B). The PCB 214 interacts with the battery cell 210 and the display 216 to show information such as an amount of charge remaining in the battery cell 210. Such systems including a battery cell 210, on/off switch 213, PCB 214, and display 216 are well known in the art and will not be further described herein. In some examples the PCB 214 is received in a set of rails 215 within the support structure 208.

The battery module 200 also includes two electrodes 218 to transmit energy from the battery cell 210 to the cartridge(s) 300 as will be discussed in more detail below. The electrodes 218 interact with terminals on the battery cell 210 as is well known in the art. In one example the electrodes 218 are copper electrodes.

The battery module 200 also includes one or more connectors 220 that are configured to engage with a cartridge 300. The connectors 220 in one example include tabs extending from the housing side wall 204 or the support structure 208. In the example of FIG. 2A-E (as best seen in FIG. 2E), the support structure 208 includes one or more tabs 220a configured to interface with the cartridge 300. The connectors 220 may also include one or more magnets 220b such as neodymium-based magnets configured to interface with magnets in the cartridge 300.

In one example, the battery module 200 includes one or more seals for limiting airflow through the battery module 200 thereby directing air through the cartridge(s) 300. The one or more seals can be rigid or semi-rigid plastic or compliant plastic such as silicone. In the particular example of FIGS. 2A-E (as best seen in FIGS. 2D-E), the battery module 200 includes a seal 222a situated between the battery cell 210 and the housing bottom wall 206 as well as additional seals 222b/222c situated within the housing 202.

In one example, the battery module 200 also includes a microphone 224. The microphone may be configured to play a sound indicating low battery, for example, as directed by the PCB 214. The use of microphones in conjunction with a PCB 214 in this manner is well known and will not be discussed further herein.

Figure 2F:
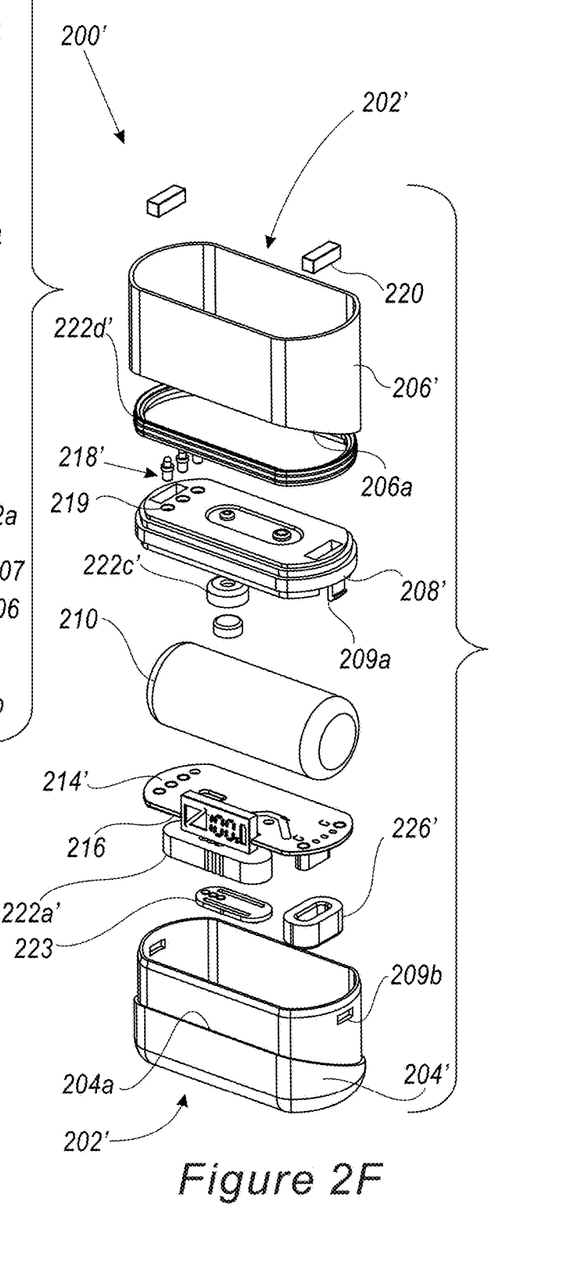
FIG. 2F illustrates another example battery module.

FIG. 2F shows another example battery module 200'. The example battery module 200' of FIG. 2F can be used in place of the battery module 200 discussed above with any of the other components for the vaporizer device 100 described herein. The example battery module 200' is similar to the battery module 200 but certain features will be described in detail below. It should be understood that any feature of the battery module 200 can be used with the battery module 200' and vice versa.

In this example, the battery module 200' includes a housing 202' which in turn includes a base portion 204' and a side wall 206'. In this example the base portion 204' includes a bottom wall. The base portion 204' also includes an angled step 204a which interfaces with a bottom edge 206a of the side wall 206'. A support structure 208' is situated in the side wall 206'. In this example the support structure 208' is a generally flat structure with a geometry that generally tracks the footprint of the base portion 204'. In certain examples the support structure 208' includes a tab 209a configured to be received in an opening 209b in the base portion 204' to connect the support structure 208' to the base portion 204'.

The battery module 200' also includes a battery cell 210. A PCB 214' is received in the base portion 204'. In this example, the PCB 214' has a perimeter that tracks the footprint of the base portion 204'. The battery module 210 is situated between the PCB 214' and the support structure 208'. The PCB 214' may include a display 216 and may rest within a seat 226'.

In some examples one or more seals 222a'/222b' are situated between the PCB 214' and the base portion 204'. Likewise one or more seals 222c'/222d' are situated between the support structure 208' and the battery cell 210/side wall 206', respectively. An optional air regulator valve 223 may also be situated between the PCB 214' and the base portion 204'. The air regulator valve 223 controls airflow through the vaporizer device 100.

The battery module 200' also includes connectors 220 such as magnets for connecting the battery module 200' to a cartridge 300/300' as discussed herein.

The battery module 200' also includes electrodes 218' to transmit energy in from the battery cell 210 to the cartridge(s) 300/300' as will be discussed in more detail below. The electrodes 218' interact with terminals on the battery cell 210 as is well known in the art. Three electrodes 218' are included in the example of FIG. 2F but more or less electrodes 218' can be used. In this example, the electrodes 218' are supported in openings 219 in the support structure 208'. The electrodes 218' in this example are spring electrodes however it should be understood that copper electrodes could also be used.

Figure 3A:
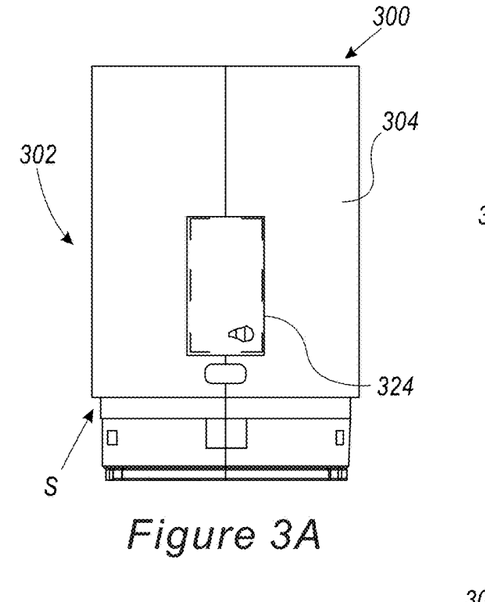
FIG. 3A illustrates a top view of the cartridge.
Figure 3B:
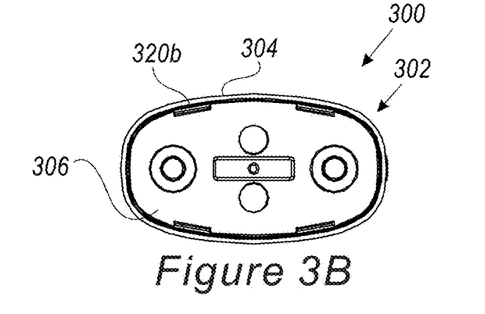
FIG. 3B illustrates a bottom view of the cartridge.
Figure 3C:
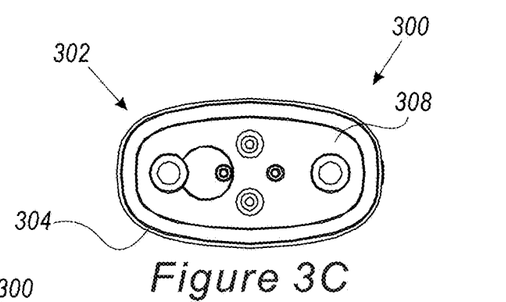
FIG. 3C illustrates a side view of the cartridge.
Figure 3D:
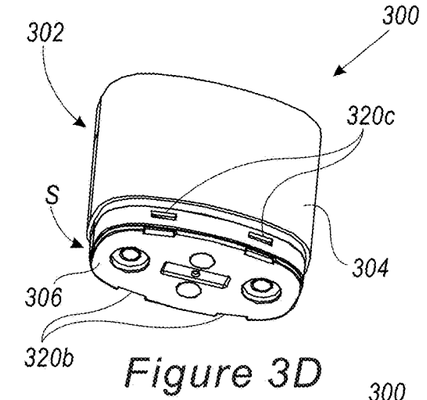
FIGS. 3D-E illustrate perspective views of the cartridge.
Figure 3E:
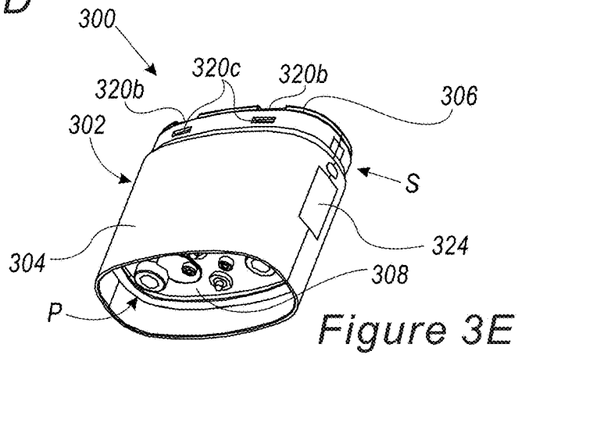
Figure 3F:
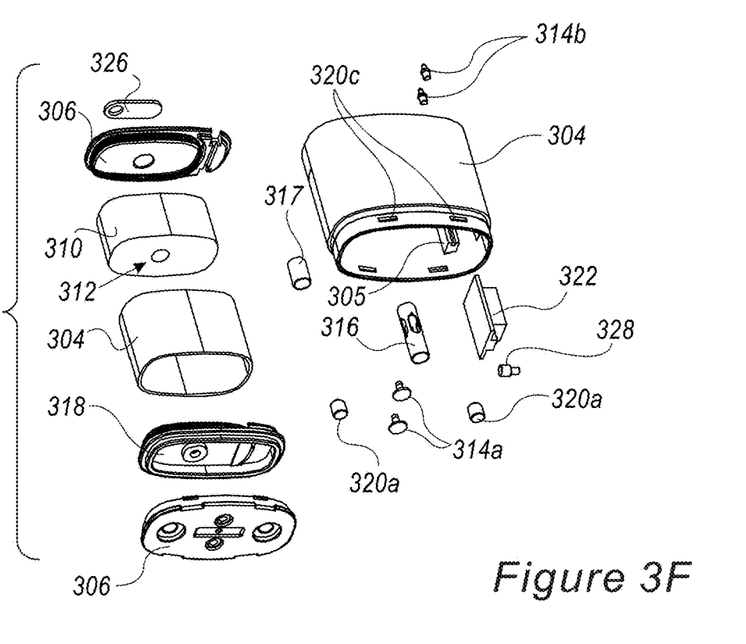
FIG. 3F illustrates an exploded view of the cartridge.

Turning now to FIGS. 3A-F, the cartridge 300 will now be described. FIG. 3A illustrates a side view of the cartridge 300. FIG. 3B illustrates a bottom view of the cartridge. FIG. 3C illustrates a top view of the cartridge. FIGS. 3D-E illustrate perspective views of the cartridge. FIG. 3F illustrates an exploded view of the cartridge. The cartridge 300 includes a housing 302 with a side wall 304, a bottom wall 306, and a top wall 308. In a particular example the side wall 304 and bottom wall 306 are rigid or semi-rigid plastic while the top wall 308 is a compliant silicone. In this example the top wall 308 provides sealing to encourage airflow through the vaporizable material within the cartridge 300 which will be described in more detail below.

In one example the cartridge 300 includes a step S between the bottom wall 306 and the side wall 304 such that a bottom portion of the cartridge 300 has a smaller diameter than the remainder of the cartridge 300. The smaller diameter bottom portion is configured to be received in the pocket P of the battery module 200, discussed above. At the same time, the side wall 304 overhangs the top wall 308 to form a pocket P similar to the pocket P of the battery module 200 (best seen in FIG. 3E). In this way, a first cartridge 300a can receive the smaller diameter portion of a second cartridge 300b so that multiple cartridges can be used in series as shown in FIGS. 1A-B.

The cartridge 300 also includes vaporizable material situated in the housing 302. In one example the vaporizable material is dispersed in a liquid which is absorbed into a wick 310. The wick 310 includes an opening 312 configured to receive a heating element which is discussed in more detail below. In other example the vaporizable material can be provided in other forms. The wick 310 can be comprised of a cotton-like absorbent material such as polypropylene or polyethylene or combinations thereof.

The cartridge 300 includes a first set of electrodes 314a which are configured to interact with the electrodes 218 in the battery module 200 to transmit energy in the form of heat energy from the battery module 200 to the vaporizable material in the cartridge 300. The interaction may include direct contact. A heating element 316 such as a coil is configured to receive heat from the electrodes 314a. In one example the heating element 316 is a nichrome coil.

The cartridge 300 also includes a second set of electrodes 314b configured to transmit heat energy received in first cartridge 300a/300b/300c at the first set of electrodes 314a to another cartridge 300a/300b/300c connected to the first cartridge 300a/300b/300c as shown in FIGS. 1A-B. In this way, multiple cartridges 300a/300b/300c can be connected in series to a common battery module 200 thereby allowing for the customization of flavors/scents/active ingredients as discussed above. The electrodes 314a/314b can be the same or different. In one example the electrodes 314a/314b are copper electrodes. One or both of the first and second sets of electrodes 314a/314b can be copper coil electrodes.

Where the wick 310 is used, the heating element 316 is configured to be at least partially received in the opening 312 in the wick 310. Otherwise, the heating element 316 is arranged adjacent to the vaporizable material in the cartridge 300 so as to heat it. In one example, the heating element 316 is at least partially situated in a protective tube 317 such as a glass fiber tube which protects the wick 310 from direct contact with the heating element 316 and minimizes the likelihood of the wick 310 overheating and becoming burnt or singed.

In one example the cartridge 300 includes a seal 318 situated between the bottom wall 306 and the wick 310. The seal 318 encourages airflow through the wick 310 and the vaporizable material therein.

In one example the cartridge 300 includes connectors 320 configured to engage with another cartridge 300 and/or the battery module 200. For instance the connectors 320 may include one or more magnets 320a such as neodymium-based magnets which are operable to interact with magnets 220b in the battery module 200 to connect the battery module 200 to the cartridge 300. The magnets 320a may also be configured to interact with magnets 320a in other cartridges 300. In some examples the connectors 320 also include openings 320b configured to receive the tabs 220a in the battery module 200 which are discussed above. In some examples the connectors 320 include tabs 320c. The tabs 320c can be configured to interface with the mouthpiece 400 which will be discussed below. The tabs 320c may also be received in openings 320b of another cartridge 300 to connect multiple cartridges 300a/300b/300c to one another.

In some examples the cartridge 300 includes a PCB 322 with a display 324 (best seen in FIG. 3A) which is configured to display information such as an amount of vaporizable material remaining in the cartridge 300. The PCB 322 may be received in a set of rails 305 in the housing side wall 304.

In some examples the cartridge 300 includes a cotton pad 326 on the top wall 308 to absorb any vaporizable material that may exit the cartridge 300 during use.

In some examples the cartridge 300 may include a button 328. The button 328 is operable to affect the power/voltage received by the heating element 316 via the first set of electrodes 314a as discussed above. In turn, the button 328 is operable to increase the amount of flavor/scent/active ingredient provided by the cartridge 300 to the user, as the amount of power/voltage received by the heating element 316 is directly related to the amount of the flavor/scent/active ingredient provided to the user. That is, the more power/voltage provided to the heating element 316, the more of the flavor/scent/active ingredient vaporized by the heating element 316, and the more of the flavor/scent/active ingredient provided to the user. In this way, the user may select one of multiple cartridges 300 to emphasize while using the vaporizer device 100 by pressing the button 328.

Figure 3G:
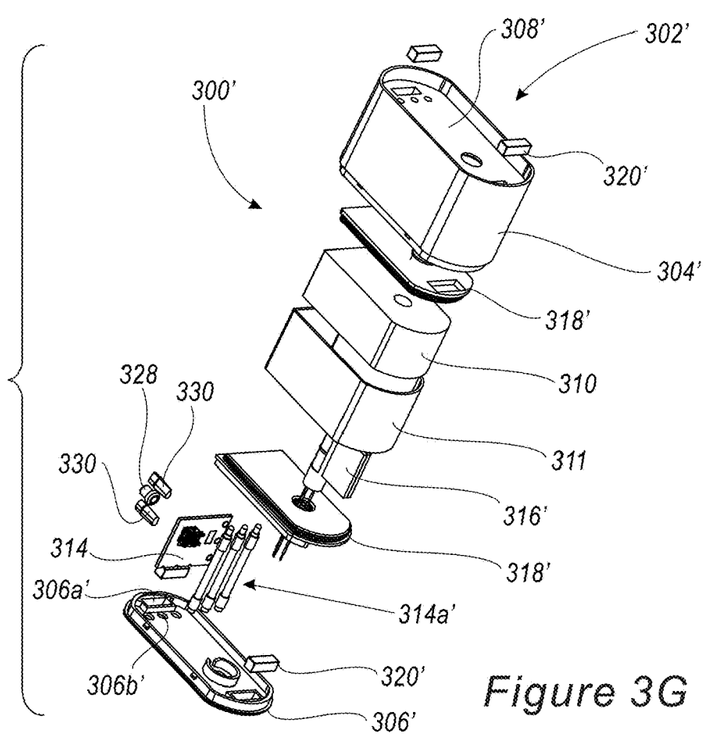
FIG. 3G illustrates another example cartridge.

FIG. 3G shows another example cartridge 300'. The example cartridge 300' of FIG. 3G can be used in place of the cartridge 300 discussed above with any of the other components for the vaporizer device 100 described herein. The example cartridge 300' is similar to the cartridge 300 but certain features will be described in detail below. It should be understood that any feature of the cartridge 300 can be used with the cartridge 300' and vice versa.

The cartridge 300' includes a housing 302' which includes a bottom wall 306' and a side wall 304'. The side wall 304' includes a top wall 308'. A wick 310 is situated in a wick housing 311 which in turn is situated in the housing 302'. In this example seals 318' are situated between the wick 310/wick housing 311 and the bottom wall 306' and the wick 310/wick housing 311 and the side wall 304', respectively. The seals 318' could be silicon seals, in some examples.

The cartridge 300' also includes a PCB 314. In this example the PCB 314 is supported in an opening 306a' in the bottom wall 306'.

The cartridge 300' also includes a set of electrodes 314a' which are configured to interact with the electrodes 218/218' in the battery module 200/200' to transmit energy in the form of heat energy from the battery module 200/200' to the vaporizable material in the cartridge 300/300'. In this example there are three electrodes in the set 314a' however more or less electrodes could be used. In this example the electrodes are spring electrodes however copper electrodes/copper coil electrodes could also be used. In this example the electrodes are supported in openings 306b' in the bottom wall 306'. The electrodes 314a' are operable to also transmit energy to other cartridges similar to the second set of electrodes 314b in the cartridge 300 as discussed above, however, in other examples, another set of electrodes could be used in the cartridge 300' as in the cartridge 300 discussed above.

The cartridge 300 also includes a heating element 316'. The heating element 316' is in one example received at least partly in the wick housing 311 and may extend through an opening in one or both seals 318'.

The cartridge 300' also include connectors 320' such as magnets for connecting to another cartridge 300/300' and/or the battery module 200/200'.

In some examples the cartridge 300' may include a button 328.

In some examples the cartridge 300' includes one or more LED lights 330 associated with the PCB 314, button 328, and/or battery module 200/200' as is well known in the art. Pressing of the button 328 may activate one or both of the LED lights 330 via the PCB 314 to give an indication to a user. In other examples more or less LED lights 300 could be used.

The LED lights 330 may give other indications to a user. For instance, one or both of the LED lights 300 may shine in a color such as green to indicate the vaporizer device 100 is on. As another example, one or both of the LED lights 330 may shine in a first color to indicate the battery cell 210 is charging and another color to indicate the battery cell 210 is fully charged. Yet another color, such as red, could be used to indicate the battery cell 210 needs charging. In one example, flashing could also be used as in indicator. For instance a flashing red light can indicate a malfunction within the vaporizer device 100.

In another example where more LED lights 330 are used, such as four lights, the lights can flash in series to make certain indications as well. For example the lights could flash in a particular order such as 1-2-3-4 where each of the LED lights 300 correspond to a number to make a first indication and in another order such as 4-3-2-1 to make a second indication. The lights could also be used together to indicate battery power. For instance two of four lights shining could indicate the battery cell 210 is halfway charged.

Figure 4A:
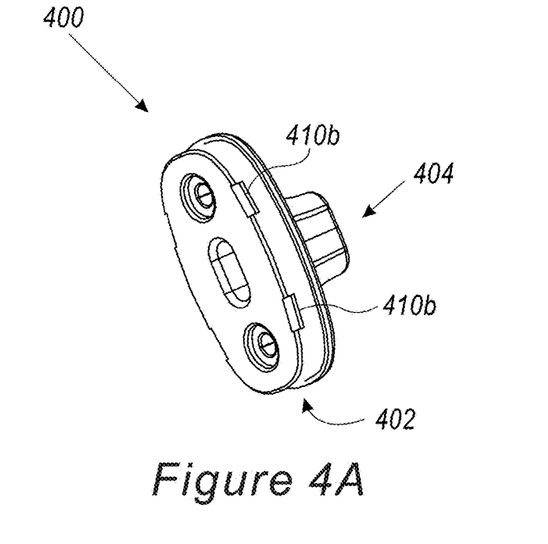
FIG. 4A illustrates an example optional mouthpiece for the vaporizer device of FIGS. 1A-B.
Figure 4B:
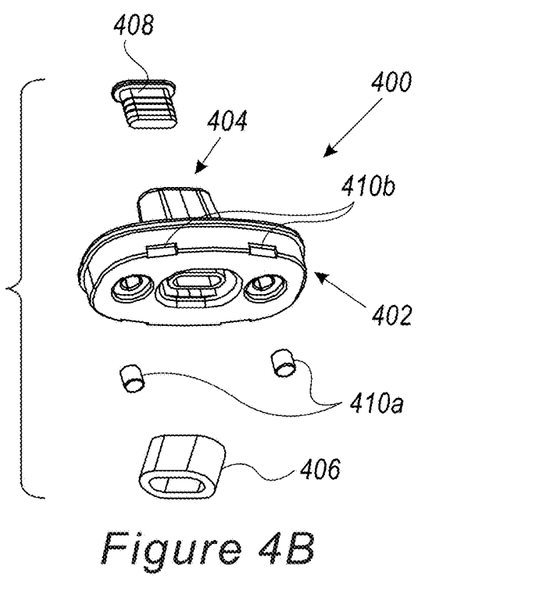
FIG. 4B illustrates an exploded view of the mouthpiece.

Turning now to FIGS. 4A-B, the optional mouthpiece 400 will now be described. The optional mouthpiece 400 includes a top portion 402 and an outlet 404 extending from the top portion 402. The mouthpiece 400 may also include a filter piece 406 comprising a paper-like material such as a polypropylene- or polyethylene-based material for filtering output from the cartridge(s) 300. The mouthpiece 400 may also include a silicone plug 408 at the outlet 404 which improves user comfort when using the mouthpiece 400. The mouthpiece 400 also includes connectors 410 configured to connect the mouthpiece 400 to a cartridge 300. For instance the connectors 410 may include magnets 410a such as neodymium magnets configured to interact with magnets 320a in the cartridge 300. The connectors 410 may also include openings 410b configured to receive tabs 320c of the cartridge 300 discussed above.

In operation, a user applies suction to the mouthpiece 400 via the outlet 404, causing air to draw though the cartridge(s) 300a/300b/300c. The battery module 200 causes the heating element 316 to heat the vaporizable material and vaporize it. The vaporized material travels with the air into the person's mouth. Where multiple cartridges 300a/300b/300c are used, the air includes mixed vaporized material from each of the cartridges 300a/300b/300c. In other examples where a mouthpiece 400 is not used, other means of drawing air through the cartridge can be used such as the fan and nozzle discussed above.

Figure 4C:
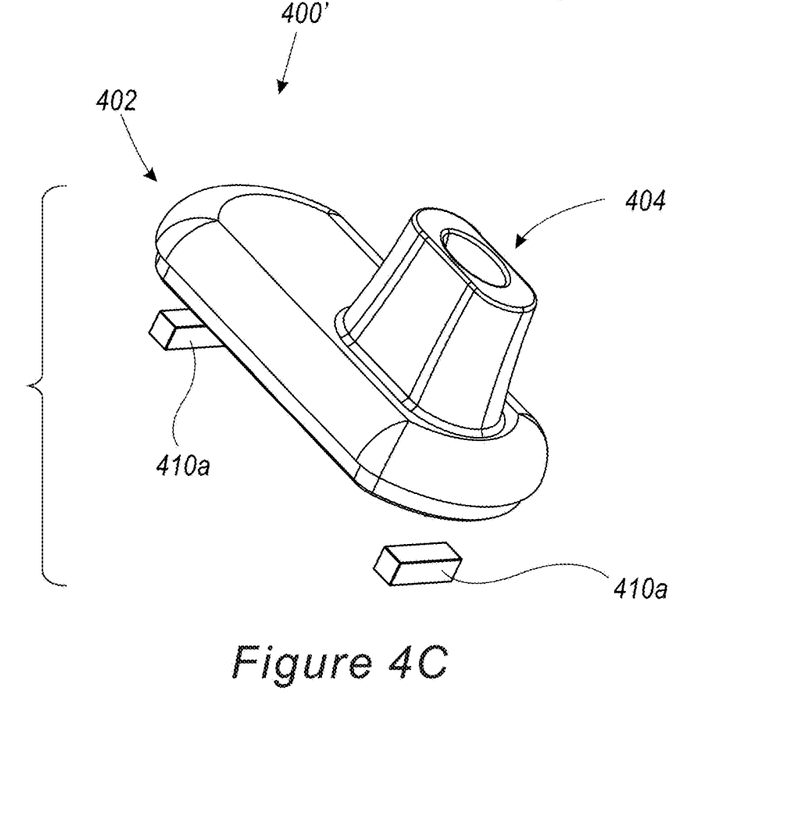
FIG. 4C shows another example mouthpiece.

FIG. 4C shows another example mouthpiece 400'. The mouthpiece 400' is similar to the mouthpiece 400 except that in the mouthpiece 400, the outlet 404 is centered with respect to the rest of the mouthpiece 400 whereas in the mouthpiece 400' the outlet 404 is offset from the center.

Figure 5A:
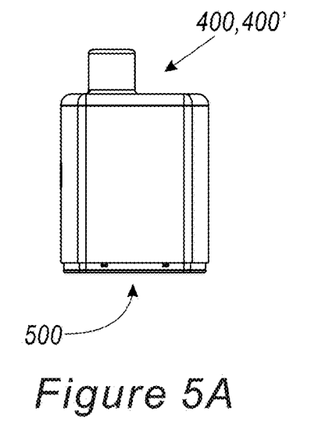
FIGS. 5A-B show a front a side view of the cigarette adapter, respectively.
Figure 5B:
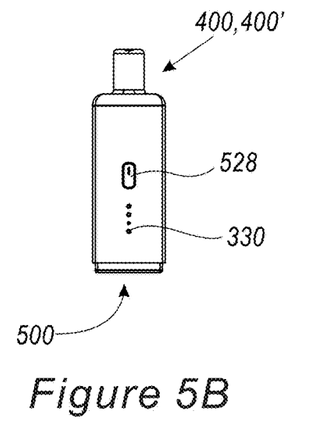
Figure 5C:
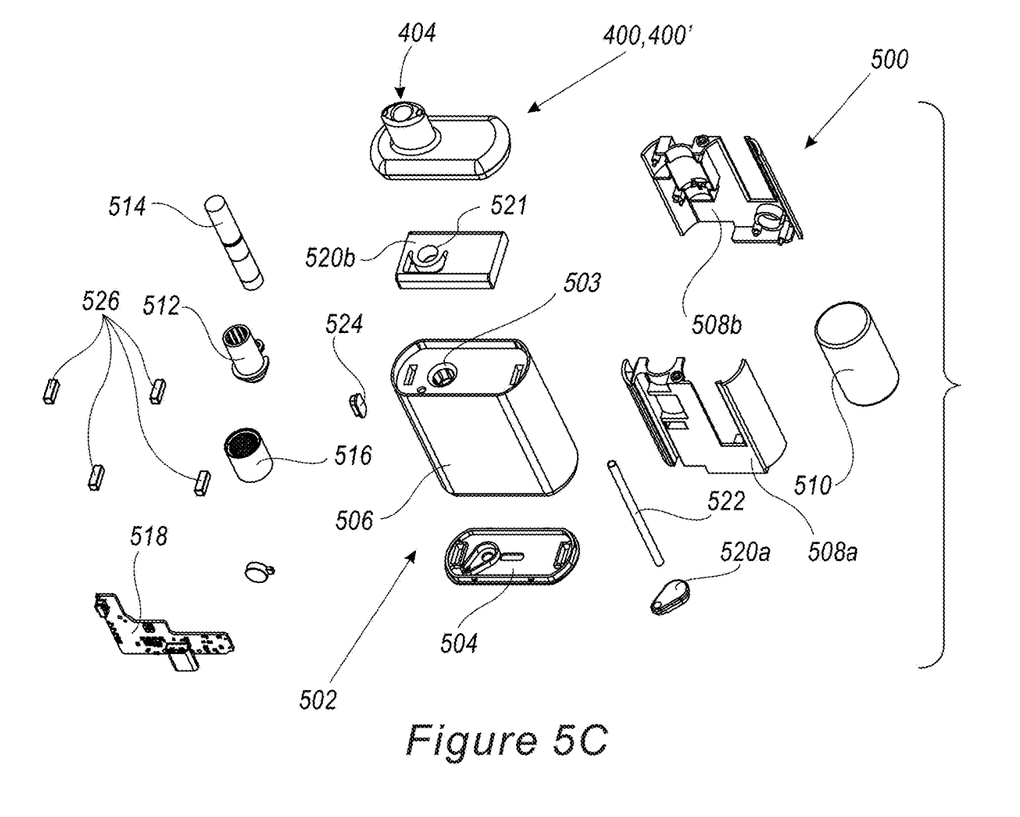
FIG. 5C shows an exploded view of the cigarette adapter.

FIGS. 5A-C show a cigarette adapter 500. FIGS. 5A-B show a front view and a side view of the cigarette adapter 500 while FIG. 5C shows an exploded view of the cigarette adapter 500. The cigarette adapter 500 can be used with one or more cartridges 300/300' and a battery module 200/200' as a vaporizer device 100. In a particular example the cigarette adapter 500 is configured to be used with at least one, or in further examples, at least two cartridges 300/300' which are removably coupled to the vaporizer device 100.

The cigarette adapter 500 includes a housing 502 which has a bottom piece 504 and a side wall 506, both of which can be plastic in some examples. The cigarette adapter 500 also includes support structures 508a/508b situated in the housing 502 and configured to hold the other components in place.

The cigarette adapter 500 also includes a battery cell 510 which is similar to the battery cell 210 discussed above. The battery cell 510 powers a heating element 516, discussed below.

The cigarette adapter 500 also includes a cup 512 situated in the housing 502 and configured to receive a distal end of a cigarette 514. The cup 512 may be a plastic cup. In some examples the distal end of the cigarette 514 also passes through an opening 503 in the housing 502 when received in the cup 512.

A heating element 516 is situated near the cup 512 and configured to provide heat to the cigarette 514 to heat it via power from the battery cell 510. Using a battery 510 to power a heating element 516 is well known in the art, but as an example an electrode can be used to transmit energy from the battery 510 to the heating element 516 as discussed above. The heating element 516 does not burn or combust the cigarette but rather heats it more gently to provide a nicotine-containing vapor.

The cigarette adapter also includes a PCB 518 which is configured to interact with the battery cell 510, heating element 516, and/or button 524 (discussed below) similar to the PCBs 214/314 discussed above.

The cigarette adapter 500 may also include one or more seals 520 for limiting airflow through the battery module 200 thereby directing air through the cartridge(s) 300/300'. In the example of FIG. 5C a first seal 520a is associated with the bottom wall 504 and a second seal 520b is associated with the side wall 506. The second seal 520b includes an opening 521 configured to receive the distal end of the cigarette 514.

The cigarette adapter 500 also includes a button 524 which may have the functionality of any of the buttons discussed above.

The cigarette adapter 500 also includes a mouthpiece 400/400'. In the example of FIG. 5C a mouthpiece like mouthpiece 400' is shown however it should be understood that the mouthpiece 400 could also be used. The outlet 404 is configured to receive a proximal end of the cigarette 514.

The cigarette adapter 500 also includes a tube 522. The tube 522 is a conduit for vapor from the cartridge(s) 300/300' to flow to the mouthpiece 400/400'. In this way, the nicotine-containing vapor from the cigarette 514 and vapor from the cartridge(s) 300/300' are mixed and provided to a user at the mouthpiece 400/400'. In a particular example, vapor from the cartridge(s) 300/300' provides a flavor that mixes with the nicotine-containing vapor.

The cigarette adapter 500 also includes connectors such as magnets 526 for connecting the cigarette adapter to a cartridge 300/300' and mouthpiece 400/400'.

In operation the cigarette adapter 500 is similar to the vaporizer device 100. When a user draws air through the mouthpiece, the user receives a combination of vapor from the cartridge(s) 300/300' and the cigarette 514.

Even if not shown in FIG. 5C, it should be understood that the cigarette module 500 can include any of the features described above, including the LED lights, charging port, etc. For instance as shown in FIG. 5B the cigarette module includes four LED lights 330 and an on/off switch.

Having fully described at least one embodiment of the present invention, other equivalent or alternative designs according to the present invention will be apparent to those skilled in the art. While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A vaporizer device comprising:
   a battery module including:
      a housing having a side wall and a bottom wall;
      wherein the housing defines an opening and the bottom wall includes a tab configured to be received in the opening to connect the side wall and the bottom wall;
      a support structure situated in the side wall and engaged with the bottom wall;
      wherein the side wall overhangs the support structure to form a pocket;
      a rechargeable battery cell situated in the support structure;
      a first plurality of electrodes configured to transmit energy from the rechargeable battery cell; and
      at least one seal situated between the rechargeable battery cell and the bottom wall and configured for limiting airflow through the battery module;
   a cigarette adapter configured to heat a cigarette to produce a nicotine-containing vapor and including a mouthpiece having a top portion and an outlet extending from the top portion and configured for receiving a proximal end of the cigarette;
   wherein the cigarette adapter has:
      an adapter housing having a bottom piece and a housing side wall;
      a cup situated in the adapter housing and configured to receive a distal end of the cigarette;
      an adapter heating element situated adjacent the cup and configured to provide heat to the cigarette without burning or combusting the cigarette; and
      an adapter battery cell situated within the adapter housing and configured for powering the adapter heating element; and
   at least one cartridge comprising a vaporizable material including a flavor, wherein the at least one cartridge is removably coupled to the cigarette adapter such that the cigarette adapter is operable to receive a vapor from the vaporizer device and provide the vapor together with the nicotine-containing vapor to the mouthpiece;
   wherein the at least one cartridge includes:
      a bottom portion configured to be received into the pocket of the battery module;
      a remainder portion separate from the bottom portion;
      a cartridge housing having:
         a cartridge bottom wall;
         a cartridge top wall;
         a cartridge side wall overhanging the cartridge top wall to form a second pocket; and
         a step between the cartridge bottom wall and the cartridge side wall such that the bottom portion has a smaller diameter than the remainder portion; and
      a first set of electrodes configured to interact with the first plurality of electrodes of the battery module to transmit heat energy from the battery module to the vaporizable material.

2. The vaporizer device of claim 1,
   wherein the at least one cartridge further includes a heating element arranged adjacent to and configured for heating the vaporizable material;
   wherein the vaporizable material is dispersed in a liquid absorbed into a wick that defines an opening configured to receive the heating element.

3. The vaporizer device of claim 1, wherein the at least one cartridge is removably coupled to the cigarette adapter by at least one magnet.

4. The vaporizer device of claim 1,
   wherein the cigarette adapter further comprises a tube that is a conduit for vapor formed from the vaporizable material to flow from the at least one cartridge to the mouthpiece to mix and provide the nicotine-containing vapor and the vapor at the mouthpiece;
   wherein the at least one cartridge is a first cartridge and the flavor is a first flavor; and
   wherein the vaporizer device further comprises a second cartridge removably coupled to the first cartridge such that the tube is operable to receive a second vapor from the second cartridge;
   wherein the first cartridge receives the second cartridge within the second pocket so that the first cartridge and the second cartridge are disposed in series; and
   wherein the first cartridge further comprises a second set of electrodes configured to transmit heat energy received in the first cartridge at the first set of electrodes to the second cartridge so that the first cartridge and the second cartridge are connected in series to the battery module.

5. The vaporizer device of claim 4, wherein the second cartridge comprises a second vaporizable material including a second flavor.

6. The vaporizer device of claim 5, wherein the first flavor is different from the second flavor.

7. The vaporizer device of claim 1, wherein the at least one cartridge is a first cartridge, and wherein the vaporizer device further comprises a second cartridge removably coupled to the first cartridge by at least one magnet.

8. The vaporizer device of claim 7, wherein the battery module is removably coupled to the second cartridge and operable to power the first and second cartridges.

9. The vaporizer device of claim 1, wherein the battery module is operable to power the at least one cartridge.

10. The vaporizer device of claim 1, wherein the battery module is removably coupled to the at least one cartridge.

11. A method of using a vaporizer device, the method comprising:
    removably coupling at least one cartridge to a cigarette adapter, wherein the at least one cartridge includes a vaporizable material having a flavor;
    wherein the cigarette adapter is configured to heat a cigarette to produce a nicotine-containing vapor and including a mouthpiece having a top portion and an outlet extending from the top portion and configured for receiving a proximal end of the cigarette;
    wherein the cigarette adapter has:
       an adapter housing having a bottom piece and a housing side wall;
       a cup situated in the adapter housing and configured to receive a distal end of the cigarette;
       an adapter heating element situated adjacent the cup and configured to provide heat to the cigarette without burning or combusting the cigarette; and
       an adapter battery cell situated within the adapter housing and configured for powering the adapter heating element;
    providing heat energy from the adapter heating element to the cigarette to create the nicotine-containing vapor; and
    providing heat energy from a battery module to the at least one cartridge to create flavored vapor, wherein the at least one cartridge is removably coupled to the cigarette adapter such that the cigarette adapter is operable to receive the flavored vapor and provide the flavored vapor together with the nicotine-containing vapor the mouthpiece;
wherein the battery module includes:
a housing having a side wall and a bottom wall;
wherein the housing defines an opening and the bottom wall includes a tab configured to be received in the opening to connect the side wall and the bottom wall;
a support structure situated in the side wall and engaged with the bottom wall;
wherein the side wall overhangs the support structure to form a pocket;
a rechargeable battery cell situated in the support structure;
a first plurality of electrodes configured to transmit energy from the rechargeable battery cell; and
at least one seal situated between the rechargeable battery cell and the bottom wall and configured for limiting airflow through the battery module; and
wherein the at least one cartridge further includes:
a bottom portion configured to be received into the pocket of the battery module;
a remainder portion separate from the bottom portion;
a cartridge housing having:
a cartridge bottom wall;
a cartridge top wall;
a cartridge side wall overhanging the cartridge top wall to form a second pocket; and
a step between the cartridge bottom wall and the cartridge side wall such that the bottom portion has a smaller diameter than the remainder portion; and
a first set of electrodes configured to interact with the first plurality of electrodes of the battery module to transmit heat energy from the battery module to the vaporizable material.

12. The method of claim 11, wherein providing the heat energy to the cigarette includes transferring power from the adapter battery cell within the cigarette adapter to the adapter heating element.

13. The method of claim 11, wherein the battery module is removably coupled to the at least one cartridge and wherein providing the heat energy to the at least one cartridge includes transferring power from the rechargeable battery cell to the first plurality of electrodes and from the first plurality of electrodes to the first set of electrodes to thereby transmit the heat energy to the vaporizable material.

14. The method of claim 11, wherein the at least one cartridge is a first cartridge and the flavor is a first flavor, and further comprising removably coupling a second cartridge to the first cartridge, the second cartridge including a second vaporizable material having a second flavor, and providing heat energy to the second cartridge to create a second flavored vapor such that the second flavored vapor from the second cartridge, the flavored vapor from the first cartridge, and the nicotine-containing vapor are together provided to the mouthpiece.

15. The method of claim 14, wherein the second flavor is different from the first flavor.

16. The method of claim 15, further comprising interchanging one of the first cartridge and the second cartridge for a third cartridge, and providing heat energy to the third cartridge such that such that a third flavored vapor from the third cartridge, one of the first flavored vapor from the first cartridge and the second flavored vapor from the second cartridge, and the nicotine-containing vapor are together provided to the mouthpiece.

17. The method of claim 14, wherein the second cartridge is removably coupled to the first cartridge by at least one magnet.

18. The method of claim 11, wherein the at least one cartridge is removably coupled to the cigarette adapter by at least one magnet.

19. The method of claim 11, wherein providing heat energy to the cigarette does not burn or combust the cigarette.

20. The method of claim 11, wherein the vaporizable material is dispersed in a liquid absorbed into a wick.

* * * * *